(12) United States Patent  (10) Patent No.: US 9,335,177 B2
Huonker et al.  (45) Date of Patent: May 10, 2016

(54) CONTROL OF AN EXTERNAL DRIVEBOX

(71) Applicant: Harman Becker Automotive Systems GmbH, Karlsbad (DE)

(72) Inventors: Michael Huonker, Rosenfeld-Isingen (DE); Richard Rutschmann, Wutoeschingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 166 days.

(21) Appl. No.: 14/097,835

(22) Filed: Dec. 5, 2013

(65) Prior Publication Data

US 2014/0163881 A1  Jun. 12, 2014

(30) Foreign Application Priority Data

Dec. 6, 2012 (EP) ..................................... 12195961

(51) Int. Cl.
*G01C 21/26* (2006.01)
*G06F 1/32* (2006.01)

(52) U.S. Cl.
CPC .............. *G01C 21/265* (2013.01); *G01C 21/26* (2013.01); *G06F 1/3268* (2013.01); *Y02B 60/1246* (2013.01)

(58) Field of Classification Search
CPC ... G01C 21/265; G01C 21/26; Y02B 60/1246
See application file for complete search history.

(56) References Cited

U.S. PATENT DOCUMENTS

| | | | |
|---|---|---|---|
| 4,796,100 A | 1/1989 | Sakaguchi | |
| 5,353,023 A * | 10/1994 | Mitsugi | G07C 5/085 340/436 |
| 5,365,448 A * | 11/1994 | Nobe | G01C 21/3605 340/988 |
| 5,515,284 A * | 5/1996 | Abe | G01C 21/32 701/410 |
| 5,684,703 A * | 11/1997 | Itoh | G01C 21/26 340/990 |
| 5,951,620 A * | 9/1999 | Ahrens | G01C 21/26 701/450 |
| 6,856,045 B1 * | 2/2005 | Beneditz et al. | 307/43 |
| 6,999,871 B2 * | 2/2006 | Ohno | G01C 21/26 340/995.18 |
| 7,043,358 B2 * | 5/2006 | Ohno | G01C 21/26 340/995.18 |
| 7,043,359 B2 * | 5/2006 | Yuasa | G01C 21/26 340/995.18 |
| 2005/0075783 A1 * | 4/2005 | Wolf et al. | 701/117 |
| 2007/0156328 A1 * | 7/2007 | Nakamura | G01C 21/26 701/532 |

(Continued)

FOREIGN PATENT DOCUMENTS

EP  0137298 A2  9/1984
JP  2006170752 A  6/2006

OTHER PUBLICATIONS

European Search Report for corresponding Application No. 12 195 961.3, mailed May 2, 2013, 8 pages.

(Continued)

*Primary Examiner* — Mussa A Shaawat
(74) *Attorney, Agent, or Firm* — Brooks Kushman P.C.

(57) ABSTRACT

A system including an automotive navigation system; an external drive; a first bus for connecting the external drive with the automotive navigation system; a second bus, which is different from the first bus, for connecting the external drive with the automotive navigation system. The external drive is connectable to the automotive navigation system via the first bus and the second bus. The automotive navigation system is adapted to read data from the external drive via the first bus. The automotive navigation system is adapted to control and to monitor the external drive via the second bus.

18 Claims, 2 Drawing Sheets

(56) References Cited

U.S. PATENT DOCUMENTS

| | | | |
|---|---|---|---|
| 2008/0065323 A1* | 3/2008 | Kobayashi | G01C 21/26 701/463 |
| 2008/0221789 A1* | 9/2008 | Oono | G01C 21/26 701/532 |
| 2009/0076662 A1* | 3/2009 | Tanaka | G01C 21/26 701/1 |
| 2009/0082961 A1* | 3/2009 | Tanaka | G01C 21/26 701/431 |
| 2009/0082965 A1* | 3/2009 | Tanaka | G01C 21/26 701/469 |
| 2009/0085776 A1* | 4/2009 | Terao | G01C 21/26 340/995.1 |
| 2009/0088205 A1* | 4/2009 | Tanaka | G01C 21/26 455/556.1 |
| 2009/0198392 A1* | 8/2009 | Eicke et al. | 701/3 |
| 2009/0326791 A1 | 12/2009 | Horvitz et al. | |
| 2011/0256905 A1* | 10/2011 | Ryan | G06F 1/1632 455/556.1 |
| 2013/0116919 A1* | 5/2013 | Furuhata | G01C 21/3629 701/408 |
| 2013/0275428 A1* | 10/2013 | Sakairi et al. | 707/736 |

OTHER PUBLICATIONS

Nikipedia, "System Bus", May 12, 2012, 4 pages.
Nikipedia, "Control Bus", Feb. 18, 2012, 2 pages.
European Office Action for corresponding Application No. 12 195 961.3, mailed Feb. 9, 2016, 5 pages.

* cited by examiner

CONTROL OF AN EXTERNAL DRIVEBOX

CROSS-REFERENCE TO RELATED APPLICATIONS

This application claims priority to EP Application No. 12 195 961.3, filed Dec. 6, 2012, the disclosure of which is incorporated in its entirety by reference herein.

TECHNICAL FIELD

The present invention relates to a system comprising an automotive navigation system and an external disk drive, in an automotive context.

BACKGROUND

Navigation systems in a vehicle are nowadays commonly used. These systems are more and more becoming control centers of a vehicle for driving, guiding and safety aspects, as well as entertainment aspects. Using a positioning system, most frequently a Global Positioning System ("GPS"), these systems provide precise instructions for navigating the vehicle through different road and traffic environments. The navigation system often serves as a central audio/video platform in the vehicle. Such diverse applications come along with the need for storage space or information stored on different media. For normal computers such as a PC or Laptop, external drives are often used for such purposes. These may be connected via a Universal Serial Bus ("USB") interface. Such external drives may be storage drives, hard disks or optical drives for Blu-ray Disk ("BD"), DVD or CD. Such drives may be temporally installed in a vehicle or may be retrofitted. The external character of such drives provides for the possibility of exchanging or upgrading them in an easy way. In an automotive environment, in a vehicle, however, the USB bus is usually not able to provide all requested functionality with respect to controllability needed or requested for such a specific environment. In a vehicle, also the Media Oriented Systems Transport ("MOST") bus may be used for connecting an external drive. However, the MOST bus is also not able to provide all requested functionality with respect to controllability needed for such an environment. This functionality may include diagnosing present states of the external drive, intervening in case a specific state of the external drive has been determined. Also, it may be requested to limit standby current per external device. Neither MOST nor USB bus would be able to provide a low standby current per external device.

It is therefore an object of the present invention to provide an improved concept for external drives for a navigation system in a vehicle.

SUMMARY

The above-mentioned object is achieved by a system comprising an automotive navigation system and an external drive according to the claims.

The invention provides a system including an automotive navigation system; an external drive; a first bus for connecting the external drive with the automotive navigation system; a second bus, which is different from the first bus, for connecting the external drive with the automotive navigation system; wherein the external drive is connectable to the automotive navigation system via the first bus and the second bus; wherein the automotive navigation system is adapted to read data from the external drive via the first bus; and wherein the automotive navigation system is adapted to control and to monitor the external drive via the second bus.

The automotive navigation system typically is integrated into the vehicle or has been retrofitted to the vehicle. It is also possible to consider portable automotive systems which are only temporarily installed in a vehicle. The first bus will typically provide basic connectivity functions and data connection functions such that the automotive navigation system may read data from the external drive or provide data to the external drive. For some external drives, the first bus may also serve for providing power to the external drive. The second bus which may also be called control bus provides additional control and diagnostic possibilities independently of the first bus. The standby power consumption of the external drive may be extremely low, for example, less than 50 µA.

In the system the automotive navigation system may be adapted to monitor the external drive via the second bus.

The state or functions of the external drive may be monitored via the second bus. It should be understood that the automotive navigation system may provide periodical reports or indications on the status of the external drive. These reports or indications may comprise optical and/or acoustical messages to the user (i.e., the driver and/or passengers) of the vehicle.

In the system, the automotive navigation system may be adapted to diagnose, via the second bus, whether or not a malfunction of the external drive has occurred, and/or may be adapted to diagnose, via the second bus, whether voltages provided via the first bus, are detectable in the external drive.

Possible incorrect behavior of the external drive may be diagnosed by the automotive navigation system via the second bus. This may include diagnosing the supplied voltages provided via the first bus.

In the system, the automotive navigation system may be adapted to place, via the second bus, the external drive into a standby mode or may be adapted to wake up, via the second bus, the external drive from a standby mode.

In the system, the automotive navigation system may be adapted to update, via the second bus, the external drive, and/or may be adapted to load, via the second bus, firmware to the external drive and/or may be adapted to load, via the second bus, firmware to the first bus.

In the system, the external drive is an optical drive suitable for reading optical disks such as Blu-ray Disk, BD, DVD or CD, and where the automotive navigation system may be adapted to monitor, via the second bus, whether an optical disk is loaded by the external drive, and/or may be adapted to eject an optical disk.

In the system, the external drive includes one or more of status indicators such as LEDs, mechanical or electronic interlock systems, motors; wherein automotive navigation system may be adapted to monitor or control one or more of the status indicators, mechanical or electronic interlock systems, or motors.

In the system, the first bus is a USB or MOST bus, and where the second bus is a Local Interconnect Network ("LIN"), Controller Area Network ("CAN"), Universal Asynchronous Receiver Transmitter ("UART"), Serial Peripheral Interface ("SPI"), or Inter-Integrated Circuit ("I2C") bus.

The invention further provides a method of controlling an external drive in a system including an automotive navigation system, the external drive, a first bus, a second bus, which is different from the first bus, the external drive being connectable to the automotive navigation system via the first bus and the second bus. The method includes reading data from the external drive via the first bus; controlling and monitoring, by the automotive navigation system, the external drive via the second bus.

The method may further include a step of diagnosing, by the automotive navigation system via the second bus, whether or not a malfunction of the external drive has occurred, and/or whether voltages provided via the first bus, are detectable in the external drive.

The method may further include a step of putting, by the automotive navigation system via the second bus, the external drive to a standby mode or waking up, by the automotive navigation system via the second bus, the external drive from standby mode.

The method may further include a step of updating, by the automotive navigation system via the second bus, the external drive, and/or loading, by the automotive navigation system via the second bus, firmware to the external drive and/or loading, by the automotive navigation system via the second bus, firmware to the first bus.

The method may further include a step of monitoring, by the automotive navigation system via the second bus, whether an optical disk is loaded by the external drive, and/or may be adapted to eject an optical disk; wherein the external drive is an optical drive suitable for reading optical disks such as Blu-ray Disk, BD, DVD or CD.

In the method, the external drive may include one or more of status indicators such as LEDs, mechanical or electronic interlock systems, motors; and the method may further include a step of monitoring or controlling one or more of the status indicators, mechanical or electronic interlock systems, or motors.

In the method, the first bus may be a USB or MOST bus, the second bus may be a LIN, CAN, UART, SPI, or I2C bus.

BRIEF DESCRIPTION OF THE DRAWINGS

Additional features and advantages of the present invention will be described with reference to the drawings. In the description, reference is made to the accompanying figures that are meant to illustrate preferred embodiments of the invention. It is understood that such embodiments do not represent the full scope of the invention.

DETAILED DESCRIPTION

Figure 1:
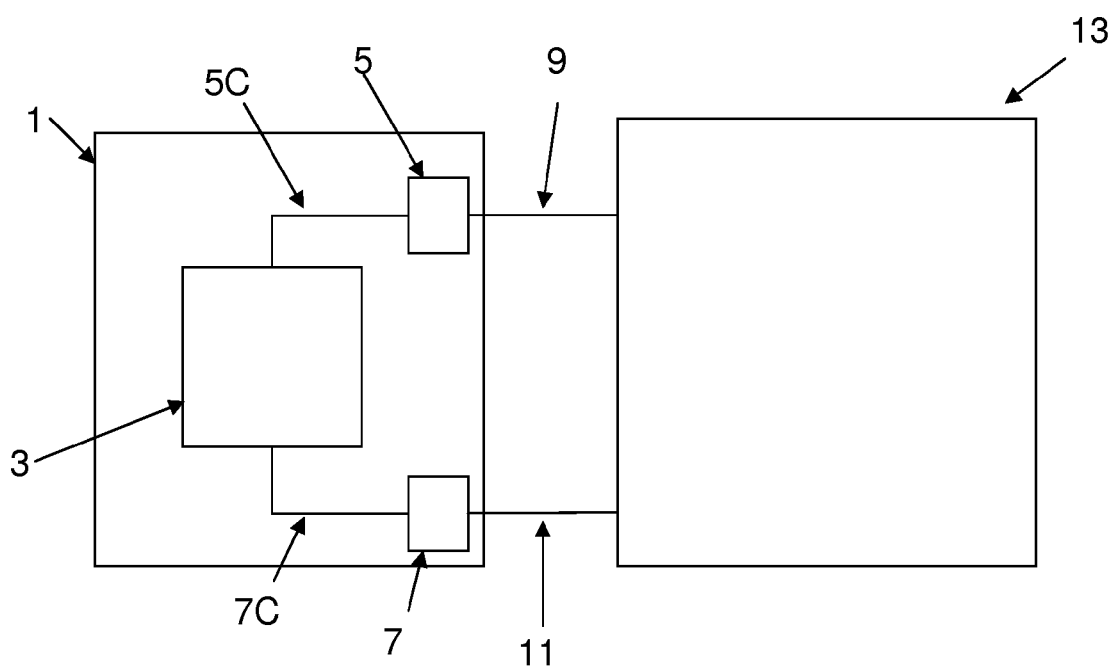
FIG. 1 illustrates a system comprising a automotive navigation system and an external drive in accordance with an example of the present invention.

In FIG. 1, a system 100 is shown which comprises an automotive navigation system 1 and an external drive 13. The automotive navigation system 1 may be installed in or integrated into the vehicle. The automotive navigation system 1 may also be retrofitted to the vehicle. The automotive system 1 may provide navigation services for the user of the vehicle using positioning systems such as a GPS or similar systems. In principle, the automotive navigation system 1 may also be a portable automotive navigation system. The automotive navigation system 1 as shown in FIG. 1 comprises an automotive navigation unit or control unit 3. This unit may also comprise a CPU. The automotive navigation unit 3 is connected via connecting line or connecting cable 5C with a first bus 5. The first bus 5 may be a USB bus or a MOST bus. The first bus 5 typically provides the data connection with an external unit. FIG. 1 depicts an external drive 13 which is connected by connection cable 9 with the first bus 5. The installation or location of the external drive 13 may be independently chosen from the location of the automotive navigation system 1. Additionally, for some external drives, the first bus 5 may provide power for the external drive 13.

FIG. 1 further shows a second bus 7. The second bus 7 is connected to the automotive navigation unit 3 by a connecting line or connecting cable 7C. Both the connecting cable 5C and the connecting cable 7C may be known cables for connecting buses. It is also possible to gather cables 5C and 7C in a common, single cable (not shown). The second bus 7 is connected with the external drive 13 by connection cable 11. The second bus 7 provides the possibility for diagnosing and controlling functions with respect to the external drive 13. The second bus 7 may operate independently of the first bus 5. The external drive 13 may be an external disk such as an external hard disk drive. The external drive 13 may be a removable drive. The external drive 13 also may comprise an optical drive such as a Blu-Ray disk, BD, or DVD or CD. The external drive 13 may further be provided with a digital rights management ("DRM") system such as Advanced Access Content System ("AACS"). In FIG. 1, the connection cables/lines 9 and 11 are directly connected with the external drive 13. It is also possible to connect cables 9 and 11 via an interface plug (not shown) for one or both of the first bus and the second bus, 5 and 7, respectively.

Figure 2:
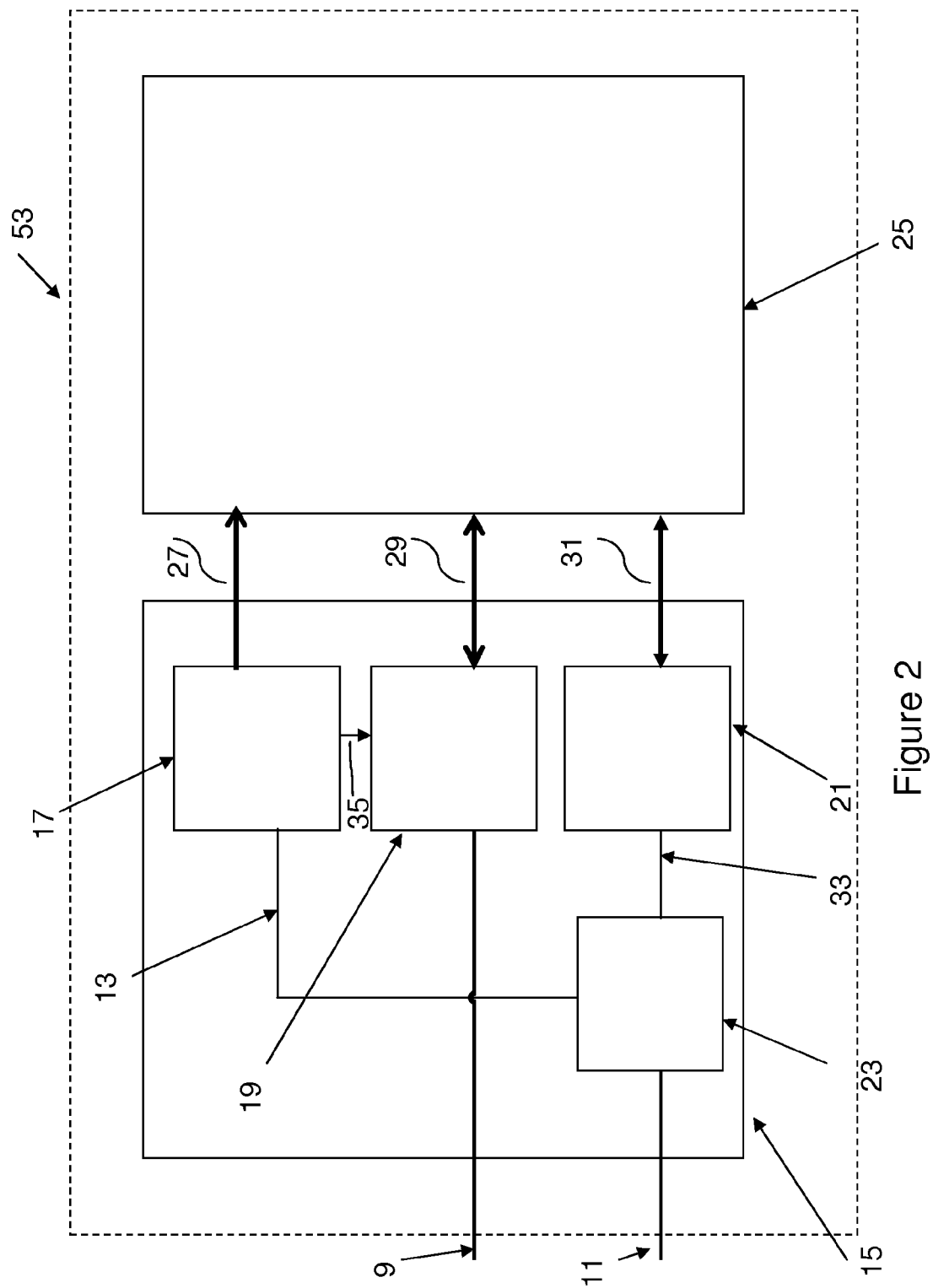
FIG. 2 illustrates a particular embodiment of the present application wherein examples of internal features of the external drive are shown.

FIG. 2 shows a further example of an embodiment of an external drive 53 in an automotive navigation system according to the present invention. The external drive 53 may be similar to the external drive 13 shown in FIG. 1. The external drive 53 as depicted in FIG. 2 comprises an electronics unit 15 and a drive unit 25. The drive unit may be an optical drive such as the BD or the DVD. The electronics unit 15 is connected via connecting lines 9 and 11 with the first and second bus as is shown in FIG. 1. The lines 9 and 11 in FIG. 2 correspond to the lines 9 and 11 in FIG. 1.

The electronics unit 15 comprises a power supply unit 17. The power supply unit 17 may provide power for the external drive 53. In particular, the power may provide power to the drive unit 25 (i.e., a BD or DVD unit). The power supply unit 17 also may provide standby power for the drive unit 25. The electronics unit 15 further comprises a bridge unit 19, for example, a USB bridge. It should be understood that MOST may be used for the first bus. The bridge unit 19 may receive power or bridge power from the power supply unit 17 via power connection 35. The power supply unit 17 thus may provide power to the bridge unit 19. The power supply unit 17 may also provide standby power to the bridge unit 19. The bridge unit 19 in FIG. 2 is connected to the first bus via connection cable 9. The bridge unit 19 provides bridging between the USB and serial AT attachment ("SATA") or between USB and AT Attachment Packet Interface ("ATAPI"). Thus, the USB to SATA or USB to ATAPI bridge provides the possibility to connect the BD or DVD unit using a standard bridge.

FIG. 2 also shows a controller unit 21. The controller unit 21 may comprise a LIN controller for connecting via the second bus 11 to the automotive navigation system as shown in FIG. 1. The LIN controller 21 may comprise EEPROM or flash memory storage. The LIN controller 21 provides the possibility for watchdog and/or reset tasks with respect to the drive unit 25 of the external drive 53.

FIG. 2 further shows a transceiver unit 23. The transceiver unit 23 may provide a wakeup for the controller unit 21. The transceiver unit 23 also may be connected via connecting cable 13 with the power supply 17 to provide a wakeup from standby for the power supply 17. It is also possible to place the power supply unit 17 in standby via the transceiver unit 23. For such a case, the automotive navigation system 1 as shown in FIG. 1 may provide the signals via the second bus 7. These signals are then communicated to the transceiver unit 23 as shown in FIG. 2 via the connecting line 11. The transceiver unit 23 may further communicate as a sender or a receiver with the controller 21 (i.e., the LIN controller in this example). In FIG. 2, the transceiver unit 23 exchanges data with the controller unit 21 via connecting cable 33.

The drive unit 25 is connected with the electronics unit 15. In particular, the power supply unit 27 provides power to the drive unit 25 via connecting cable/line 27. Thus, the standby and/or wakeup function with respect to the drive unit 25 can be performed via this connection. The bridge unit 19 connects to the drive unit 25 via the connecting line 29. As indicated above, the connection serves as a data connection. It may be ATAPI or SATA or other alternative buses. The controller unit 21 is connected to the external drive via connecting line 31. Control signals such as a signal for ejecting a disk may be communicated via connecting line 31. Connecting line 31 may also serve as a communication line for diagnosing a state of the drive unit 25, such as to verify that a disk is loaded or that no disk is present in the drive. The connecting line may also serve to diagnose further mechanical or electronic switches (not shown) of the drive unit 25. The line 27, 29 and 31 may be gathered in an FPC cable.

All previously discussed embodiments are not intended as limitations but serve as examples illustrating features and advantages of the invention. It is to be understood that some or all of the above described features can also be combined in different ways.

What is claimed is:

1. A system comprising:
   an automotive navigation system;
   an external drive;
   a first bus for connecting the external drive with the automotive navigation system; and
   a second bus, which is different from the first bus, for connecting the external drive with the automotive navigation system;
   wherein the external drive is connectable to the automotive navigation system via the first bus and the second bus;
   wherein the automotive navigation system is adapted to read data from the external drive via the first bus; and
   wherein the automotive navigation system is adapted to control and to monitor the external drive via the second bus.

2. The system according to claim 1, wherein the automotive navigation system is further adapted to at least one of (i) diagnose, via the second bus, whether or not a malfunction of the external drive has occurred, and (ii) diagnose, via the second bus, whether voltages provided via the first bus, are detectable in the external drive.

3. The system according to claim 1, wherein the automotive navigation system is further adapted to one of (i) place, via the second bus, the external drive into a standby mode, and (ii) wake up, via the second bus, the external drive from standby mode.

4. The system according to claim 1, wherein the automotive navigation system is further adapted to at least one of (i) update, via the second bus, the external drive, and (ii) load, via the second bus, firmware to the external drive, and (iii) load, via the second bus, firmware to the first bus.

5. The system according to claim 1, wherein the external drive is an optical drive suitable for reading optical disks such as one of a Blu-ray Disk (BD), DVD and CD, wherein the automotive navigation system is further adapted to at least one of (i) monitor, via the second bus, whether an optical disk is loaded by the external drive, and (ii) eject an optical disk.

6. The system according to claim 1, wherein the external drive comprises one or more of status indicators such as LEDs, mechanical or electronic interlock systems, motors; and wherein the automotive navigation system is further adapted to monitor or control one or more of the status indicators, mechanical or electronic interlock systems, and the motors.

7. The system according to claim 1, wherein the first bus is one of a Universal Serial Bus (USB) and a Media Oriented Systems Transport (MOST) bus and wherein the second bus is one of a Local Interconnect Network (LIN), a Controller Area Network (CAN), a Universal Asynchronous Receiver Transmitter (UART), a Serial Peripheral Interface (SPI), and an Inter-Integrated Circuit (I2C) bus.

8. A method of controlling an external drive in a system comprising an automotive navigation system, the external drive, a first bus, a second bus, which is different from the first bus, the external drive being connectable to the automotive navigation system via the first bus and the second bus, the method comprising:
   reading data from the external drive via the first bus; and
   controlling and monitoring, by the automotive navigation system, the external drive via the second bus.

9. The method according to claim 8, further comprising:
   diagnosing, by the automotive navigation system via the second bus, at least one of (i) whether or not a malfunction of the external drive has occurred, and (ii) whether voltages provided via the first bus, are detectable in the external drive.

10. The method according to claim 8, further comprising performing one of (i) placing, by the automotive navigation system via the second bus, the external drive into a standby mode and (ii) waking up, by the automotive navigation system via the second bus, the external drive from standby mode.

11. The method according to claim 8, further comprising performing at least one of (i) updating, by the automotive navigation system via the second bus, the external drive, (ii) loading, by the automotive navigation system via the second bus, firmware to the external drive, and (iii) loading, by the automotive navigation system via the second bus, firmware to the first bus.

12. The method according to claim 8, further comprising monitoring, by the automotive navigation system via the second bus, whether an optical disk is loaded by the external drive, or is adapted to eject an optical disk; wherein the external drive is an optical drive suitable for reading optical disks such as Blu-ray Disk (BD), DVD or CD.

13. The method according to claim 8, wherein the external drive comprises one or more of status indicators such as LEDs, mechanical or electronic interlock systems, and motors; the method further comprising monitoring or controlling the one or more of the status indicators, the mechanical or electronic interlock systems, and the motors.

14. The method according to claim 8, wherein the first bus is one of a Universal Serial Bus (USB) and a Media Oriented Systems Transport (MOST) bus and wherein the second bus is one of a Local Interconnect Network (LIN), a Controller Area Network (CAN), a Universal Asynchronous Receiver Transmitter (UART), a Serial Peripheral Interface (SPI), and an Inter-Integrated Circuit (I2C) bus.

15. An apparatus comprising:
   an automotive navigation system for providing navigation services for a user; and
   an external drive for being connected to the automotive navigation system via a first bus and a second bus that is different from the first bus; the automotive navigation system being configured to: (i) read data from the external drive via the first bus and (ii) control and monitor the external drive via the second bus.

16. The apparatus of claim 15, wherein the automotive navigation system is further configured to at least one of (i) diagnose, via the second bus, whether or not a malfunction of the external drive has occurred, and (ii) diagnose, via the second bus, whether voltages provided via the first bus, are detectable in the external drive.

17. The apparatus of claim 15, wherein the automotive navigation system is further configured to one of (i) place, via the second bus, the external drive into a standby mode, and (ii) wake up, via the second bus, the external drive from standby mode.

18. The apparatus of claim 15, wherein the first bus is one of a Universal Serial Bus (USB) and a Media Oriented Systems Transport (MOST) bus and wherein the second bus is one of a Local Interconnect Network (LIN), a Controller Area Network (CAN), a Universal Asynchronous Receiver Transmitter (UART), a Serial Peripheral Interface (SPI), and an Inter-Integrated Circuit (I2C) bus.

* * * * *